Feb. 9, 1932.  F. G. HODSDON  1,844,853
PULSATOR FOR MILKING MACHINES
Filed June 21, 1930   6 Sheets-Sheet 1
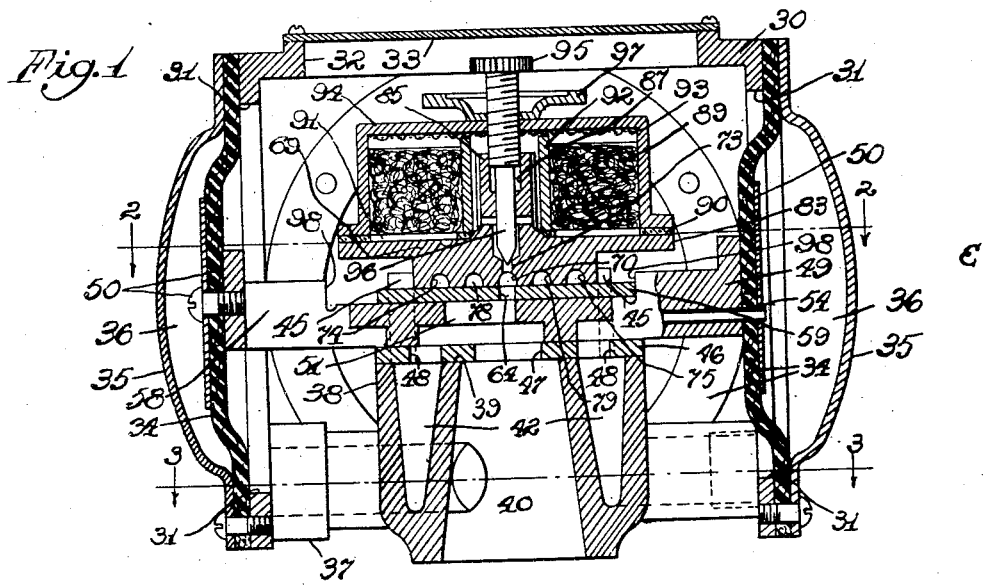
Inventor:
Floyd G. Hodsdon
By N. P. Dodge
Atty Feb. 9, 1932.  F. G. HODSDON  1,844,853
PULSATOR FOR MILKING MACHINES
Filed June 21, 1930  6 Sheets-Sheet 2
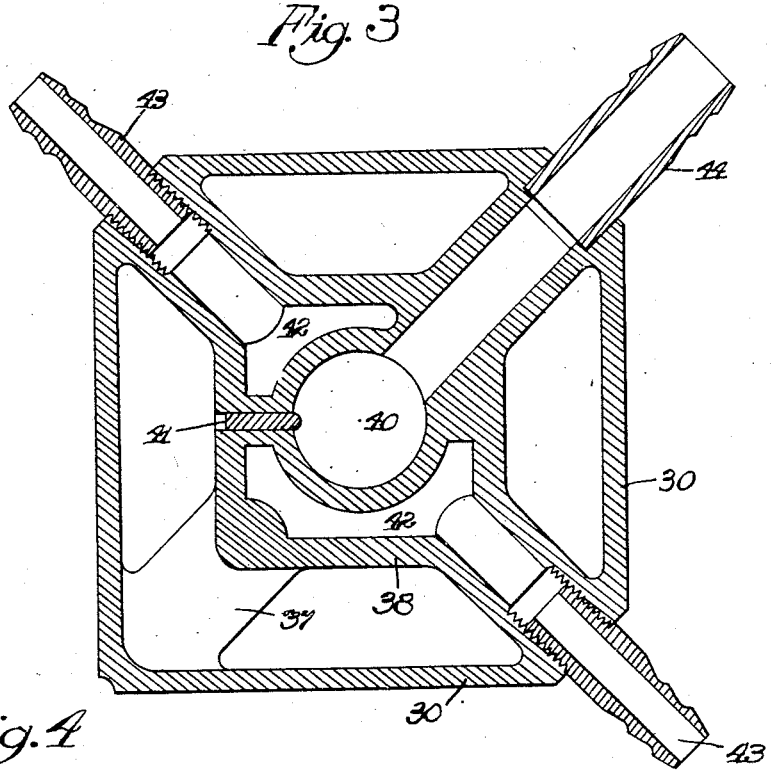
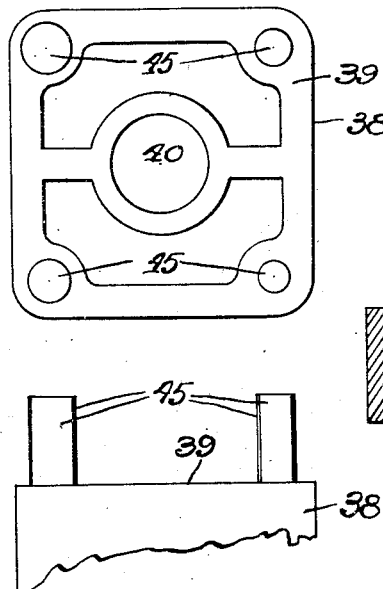
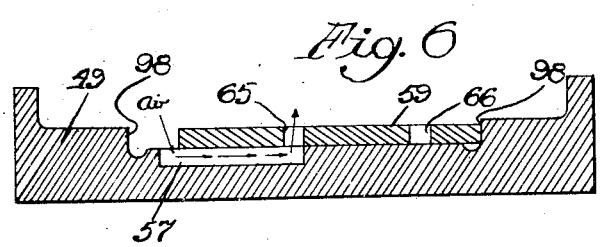
Inventor:
Floyd G. Hodsdon.

Feb. 9, 1932.   F. G. HODSDON   1,844,853
PULSATOR FOR MILKING MACHINES
Filed June 21, 1930   6 Sheets-Sheet 3

Inventor:
Floyd G. Hodsdon
By H. P. Darlack,
Atty.

Inventor.
Floyd G. Hodsdon

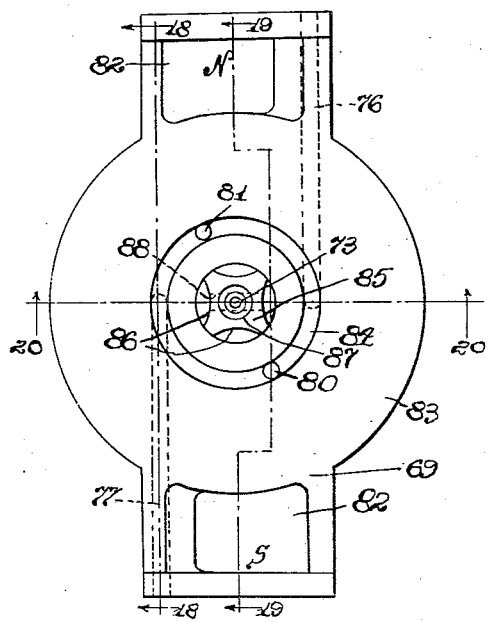

Inventor
Floyd G. Hodsdon

Patented Feb. 9, 1932

1,844,853

UNITED STATES PATENT OFFICE

FLOYD G. HODSDON, OF LA GRANGE, ILLINOIS, ASSIGNOR TO INTERNATIONAL HARVESTER COMPANY, A CORPORATION OF NEW JERSEY

PULSATOR FOR MILKING MACHINES

Application filed June 21, 1930. Serial No. 462,846.

This invention relates to an improved pulsator for use primarily in milking machines of the type employing one or two clusters of teat cups of the double-chambered variety of conventional commercial form. The energy utilized to operate the liners in the teat cups is supplied by a vacuum pump in communication with the pulsator and a milk receiver pail, the function of the pulsator being, as is well known in this art, to produce the alternate vacuum and release to atmosphere to effect the milking action, there being connections from the teat cups to lead the milk to the receiver pail.

Most pulsators as now known use leather pistons reciprocable in a cylinder. These pistons require oiling to keep them air tight. It has been found that this oil catches and accumulates dust particles, which eventually clog and seal associated ports and passageways in a manner to interfere with, if not entirely to prevent, operation of the pulsator. Change in temperature also affects the operation of oiled pistons because of variable friction between the parts resulting from viscosity change in the oil. Thus, the use of oil in pulsators is highly objectionable. Furthermore, the leather piston is a source of trouble in the event that water or moisture should accidentally contact therewith, because it results in hardening of the leathers, causing air leakage. These piston types usually employ a spring tripping device, necessitating the use of small bearings which wear and cause sluggishness in the pulsator action, and complicate manufacture and involve relatively high costs.

With these objections noted, the problem is to provide a pulsator having none of these disadvantages.

Accordingly, the primary objects of this invention are to provide an improved pulsator having a minimum number of movable parts, in fact, just two; to provide a pulsator which at no time requires oiling; to provide a pulsator of symmetrical appearance and which is capable of production at a minimum of cost; to provide a pulsator capable of assembly and tearing down without the aid of special tools, in fact, an ordinary screw driver being all that is necessary for the purpose; to provide a pulsator producing strong and definite pulsations; to provide an adjustable speed regulating means for a control valve without in any way keeping the pulsator valve from producing strong pulsations; to associate an air filter with the pulsator; and, lastly, generally to provide an improved pulsator for the purpose stated.

Briefly, such important objects may be achieved by the illustrative example of the invention shown in the accompanying sheets of drawings, in which the pulsator has a hollow, cube-shaped body carrying a diaphragm to form a diaphragm chamber on each of its four sides. Two opposed diaphragms have connected thereto an upper reciprocatory slide valve called the control valve, while the two remaining opposed diaphragms have connected thereto a lower reciprocatory slide valve called the milker valve.

Cooperative ports and grooves are provided in these slide valve members, so that, when associated with certain valve plates, the control valve regulates the action of the milker valve to result in the pulsations as required, both slide valves being always subjected to full action of air and vacuum, there being a speed regulator associated with the upper or control valve and likewise a filter, so that only clean air may pass by the regulating needle valve point.

So much will suffice for the present in giving a general idea of the pulsator structure, a practicable form of which is illustrated in the accompanying sheets of drawings, wherein:

Figure 1 is a vertical, cross sectional view of the pulsator when looking in the direction of the arrows, as seen in Figure 2;

Figure 2 is a horizontal cross sectional view as seen along the section line 2—2 in Figure 1, when looking in the direction of the arrows;

Figure 3 is a horizontal cross sectional view through the body of the pulsator when looking along the line 3—3 shown in Figure 1;

Figure 4 is a top plan view of the base portion formed as a part of the body;

Figure 5 is a side view of the base shown in Figure 4;

Figure 6 is a side sectional view, showing the lower, or milker, valve and the upper stationary valve plate associated therewith, as seen along the section line 6—6 shown in Figure 12;

Figure 15 is a top plan detail view of the upper control slide valve;

Figure 16 is a bottom plan view of the same piece shown in Figure 15;

Figure 17 is a side view of the same piece;

Figure 18 is a longitudinal cross sectional view of the same piece as shown along the line 18—18 in Figure 15, when looking in the direction of the arrows;

Figure 19 is a longitudinal sectional view through the same piece as seen along the line 19—19 appearing in Figure 15, when looking in the direction of the arrows;

Figure 20 is a cross sectional view through the same piece as viewed along the line 20—20, when looking in the direction of the arrows, as appears in Figure 15;

Figure 7:
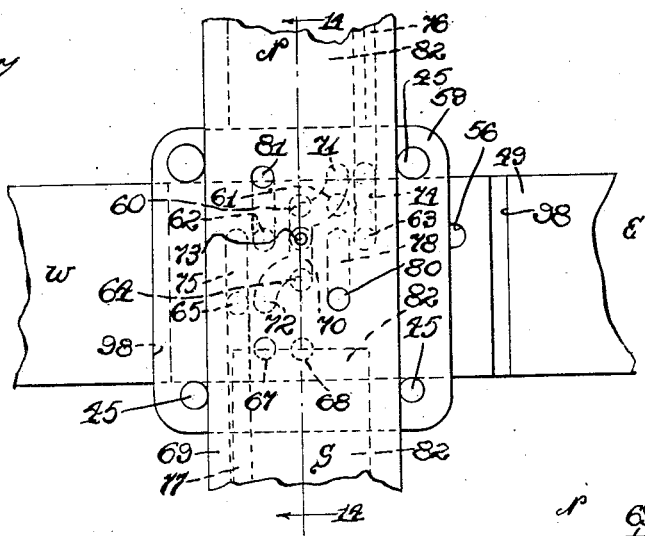
Figure 7 is a top plan view showing the upper control valve, the lower milker valve, and the upper stationary valve plate therebetween.
Figure 8:
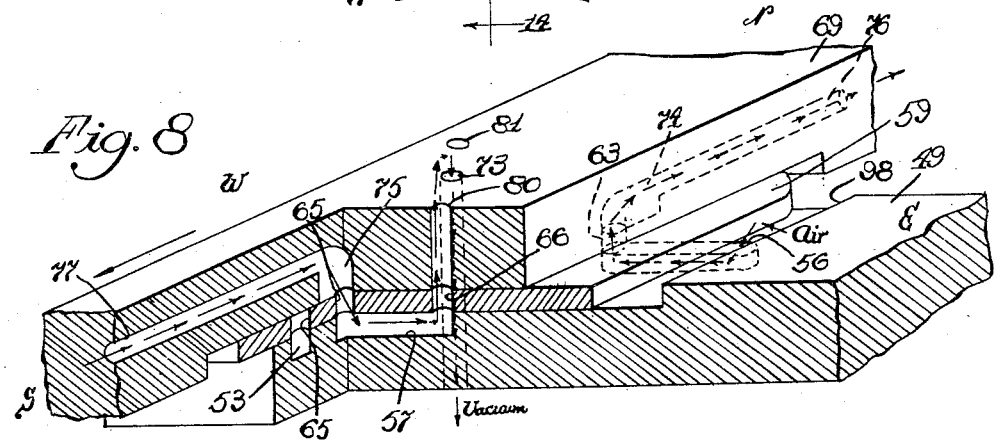
Figure 8 is a perspective view of the structure shown in Figure 7 on an enlarged scale, with a section therethrough along an irregular line to expose certain ports and grooves.
Figure 9:
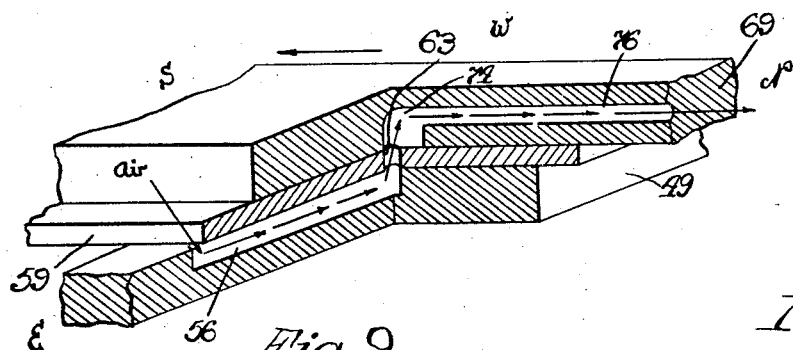
Figure 9 is a similar sectional view of the same parts taken along an irregular section line to expose to view certain other ports and grooves.

As best shown in Figures 1 to 3, inclusive, the pulsator body 30 comprises an integrally formed frame in hollow cube form having four sides and a top, each formed with a large circular opening, the side openings appearing at 31 and the top opening at 32, the latter being closed by a quickly detachable cover plate 33 to make possible ready access to and inspection of the interior parts. Each side opening is closed by a circular diaphragm 34 preferably made of a rubberized fabric, the diaphragms thus being disposed in opposed pairs, as best appears in Figure 2. These diaphragms are secured over the circular openings by means of outwardly bulged caps 35 attached by screws to the body frame. Thus, oppositely arranged diaphragm chambers 36 are formed for a purpose later to appear.

The lower part of the body includes an integrally formed frame cross 37 (see Figure 3), which merges into a centrally disposed part 38, which rises vertically to afford a flat rest or base 39, as shown in Figures 1 and 5. The part 38 is vertically hollowed out, as at 40, to form a taper socket to fit over a taper plug on a cover of a milk receiver pail. A pin 41 serves to make a quickly detachable lock whereby the pulsator may be secured to or quickly removed from the pail. This pin is part of a conventional bayonet slot arrangement and need not further be described. The part 38 includes two chambers 42 and two diametrically aligned bars of the cross 37 are drilled and tapped to receive threaded nipples 43, one each of which communicates with a chamber 42, while a third bar of the cross is drilled and tapped with a relatively large bore to receive a relatively larger nipple 44, that communicates not with the chambers 42, but with the interior of the taper socket 40, as best appears from Figure 3.

Vacuum is applied to the milk pail, not shown, through the larger nipple 44 in the pulsator, said nipple in a complete system being connected to a pipe line stall cock by a stanchion hose in a manner well understood in this art. The nipples 43 are air nipples connected by suitable hoses to the claws of the teat cup clusters. When the outfit is for milking only one cow, only one such cluster is necessary, and, accordingly, it is to be understood that one of the nipples 43 will be unscrewed and a screw plug will be substituted therefor in a manner to stop up one of the air bores in the cross 37. The fourth bar of the cross not yet mentioned is left solid and serves merely as a frame piece. The valve structure, which makes and regulates the pulsations acting in the teat cups to produce the milking action, will now be described.

Figure 27:
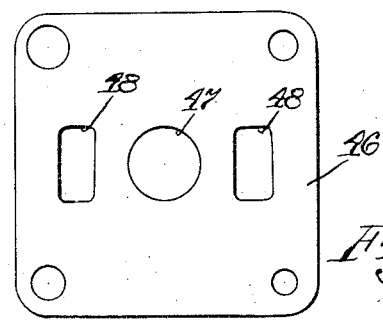
Figure 27 is a top plan view of the lower stationary valve plate.
Figure 24:
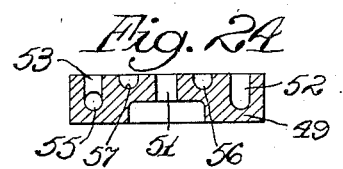
Figure 24 is a cross sectional view of the same piece as seen along the section line 24—24 appearing in Figure 21, when looking in the direction of the arrows.

The base 39 in effect forms a square horizontal table, each corner carrying a vertically extending post 45, each of a different cross sectional area, but of uniform height. Loosely fitted over these posts is a square shaped lower, stationary valve plate 46, shown in detail in Figure 27, said plate having four corner holes, each of a different size to correspond to the size of the posts 45, whereby the plate can be located only in one way to make its assembly fool proof. This plate 46 is preferably made of hardened stainless steel having surfaces ground and polished to mirror-like finish. The posts 45 prevent this valve plate from having any lateral movement whatsoever, yet it is free to float up and down on the posts 45 slightly, as occasion requires. This stationary plate 46 has a central hole 47 connecting with the vacuum supply through the taper socket 40, while side slots 48 in the plate communicate with the air chambers 42 and air nipples 43. See Figure 1.

Next in the assembly is the lower or milker slide valve 49, shown in detail in Figures 21 to 24, inclusive, which valve is disposed horizontally on the lower stationary valve plate 46 between the posts 45 which now serve as guides, said slide valve 49 being disposed to reciprocate as shown in the drawings only in an east (E) and west (W) direction. This lower or milker slide valve is preferably made of brass or other relatively soft material, so that the friction between the top surface of the plate 46 and the bottom surface of the slide valve 49 is reduced to a minimum, and, as a result, these cooperating surfaces may be run dry and no oil is required.

The E end of the slide valve is secured by means of a screw and washer 50 to the E diaphragm 34, while the W end of said valve is similarly secured by the same kind of means 50 to the W diaphragm 34, as best appears from Figure 2. The slide valve 49 is rectangular in shape (Figures 21-24, inclusive) and at the intersection of its center lines is provided with a short, lengthwise slot 51, and in cross alignment therewith the valve slide's upper surface is formed with two grooves 52, 53 in communication, respectively, with bores 54, 55 extending through the slide along its sides in opposite directions and terminating at the ends thereof to be in communication, respectively, with the E and W diaphragm chambers 36. A groove 56 is formed in the slide to one side of the slide's longitudinal center line and extends a substantial distance to the E, while an oppositely disposed, similar groove 57 extends toward the W, the inner ends of each of these grooves being cut square, as shown. At its ends, the slide 49 is provided with relatively large openings 58.

Figure 26:
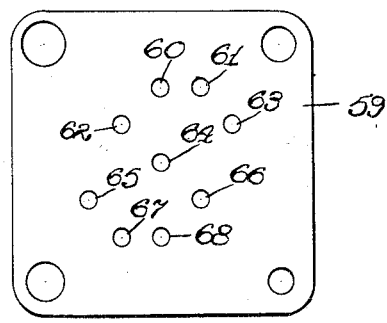
Figure 26 is a top plan view of the upper stationary valve plate.

In Figure 26 is shown the upper, stationary valve plate 59, which comes next in the assembly, said plate being like the lower plate 46 in that it is hard, polished, and has four corner holes to fit over the posts 45 in the manner already described, so that it can be assembled in only one way. The posts here too hold the plate 59 against lateral movement, but permit said plate to float, if necessary. Placed therein in the desired manner, this upper, stationary valve plate is provided with nine holes 60, 61, 62, 63, 64, 65, 66, 67 and 68.

The control slide valve is shown generally at 69 in Figures 15 to 20, inclusive, said valve being rectangular and lying between the posts 45 on the upper valve plate 59 for reciprocation as illustrated in the drawings in a north (N) and south (S) direction. This control valve is also made of brass or the like, so it will have little or no friction when sliding over the top surface of the plate 59, and consequently no oil is required. The under surface of the control slide, as appears best in Figure 16, is formed with a short, centrally disposed, lengthwise groove 70, the ends of which are continued in opposite directions to form connecting, offset grooves 71, 72. A pin hole 73 is located centrally through the groove 70 and slide plate. This slide on its bottom has also two diametrically opposed side grooves 74, 75 which, respectively, communicate with bores 76, 77 through the slide, which bores further, respectively, communicate with the N and S diaphragm chambers 36, as best shown in Figure 2, said control slide in the same manner as the milker slide 49 having its respective ends connected to the N and S diaphragms 34. Still further, this slide on its bottom is formed with two intermediate, diametrically opposed, lengthwise grooves 78 and 79, each of which at its outer extremity communicates with through-holes 80 and 81, respectively. At its ends the slide is formed with large openings 82. The top surface of this control slide is formed with an enlarged circular rest 83 and a small circular groove 84, which is in communication with the holes 80, 81 heretofore mentioned (see Figure 15). Rising centrally from the center of the groove 84, the rest is formed with an integral, cylindrical post 85 formed with four side grooves 86 and an axial, threaded hole 87 in alignment with the pin hole 73 heretofore mentioned. See Figures 15, 17 and 20. A cross bore 88 is formed diametrically through the base of the cylindrical post 85 in a manner to communicate with the grooves 86 and central bore 87.

Figure 25:
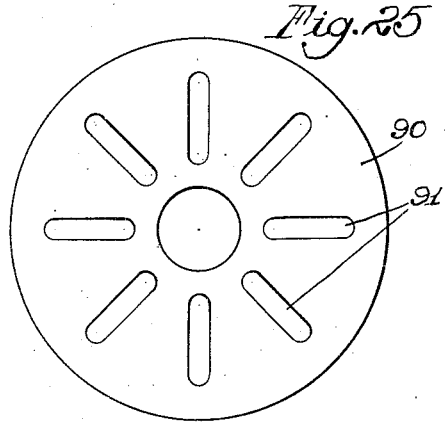
Figure 25 is a detail, top plan view of a gasket used in the pulsator.

The circular rest 83 of the control slide valve carries, as shown in Figure 1, an annular filter pack 89 of fibrous material. Between the filter 89 and rest 83 is disposed a cork gasket 90 (see Figure 25) having a central opening to fit over the stem 85 and a plurality of radial slots 91 in communication with the annular groove 84. These slots cause air to move radially out and then upwardly through the filter pack. A central, vertical sleeve 92 separates the filter pack from the grooves 86 in the stem 85, the sleeve resting on the washer 90. A wire mesh screen 93 is placed on the sleeve 92 above the pack 89, so that the cleaned air can find its way to the stem grooves 86 and into the stem bore 87. A cover 94 completes the filter assembly, which cover rests on the rest 83 and is held down by an adjusting screw 95 that includes a needle valve 96 cooperable with the pin hole 73 in the control slide valve 69, in the manner shown in Figure 1. A thumb nut 97 serves to hold the cover 94 down irrespective of the position of the adjusting screw 95 in an obvious manner. This concludes the description of the structural parts of the pulsator. The specification will now be continued by setting forth the mode of operation.

A taper plug provided on the milk receiver pail cover receives the socket 40 of the pulsator in a conventional manner. Vacuum is applied to the pail through the large nipple 44 in the pulsator, which is connected to a pipe line stall cock by a stanchion hose.

A needle valve 96 on the upper slide valve 69, called the control valve, regulates its speed by controlling the admission of air, so that, no matter how slowly the valve moves, it will nevertheless cause a rapid movement of the lower or milker slide valve 49, which remains at the end of its stroke until the control valve slowly approaches the other end of its stroke. Such a snappy, strong pulsation is the most agreeable to the cow and so milks the cow rapidly and leaves but little for hand stripping.

Four diaphragms are mounted one on each end of the two slide valves. Each diaphragm is so clamped under a cover as to allow the slide valves which are fastened to the center of the diaphragms to move freely from 5/16 inch to 3/8 inch in a horizontal direction. As vacuum is applied by a passage-way leading to the face of each slide valve, which connects through a hole to the chamber in back of each diaphragm, movement is provided in the direction to which the vacuum is applied. At the same time, the diaphragm chamber space at the opposite end of the slide valve must be opened to the atmosphere to relieve the vacuum that had previously been supplied to it.

As shown in Figure 1, for example, the milker slide valve 49 with its lower side has moved to the west position, so that vacuum has been applied to the left hand nipple 43 which connects through a rubber hose to the milker claw, not shown. The lower part of this claw, in the usual way, collects the milk from the four teat cups connected to the claw and leads it through a milk hose to the milk receiver pail, said pail and milk line being under continuous vacuum. Around the upper part of these claws in the usual way are four additional nipples which lead to the space between the teat cup rubber liner and metal teat cup shell. A rubber air hose makes the connection between this claw and the pulsator, the said hose being connected to the pulsator air nipple 44. Thus, with the milker slide valve in its west position, vacuum is applied to this liner space, which holds it in a normal position, because there is, at this time, a vacuum on both sides of the rubber liner. Milk now flows from the cow's teat until this milker pulsator valve moves to the east position. Then the east port is uncovered and air rushes in to destroy the vacuum, and so allows the rubber liner to collapse strongly upon the cow's teat, shutting off the milk and so massaging the teat in a manner to keep up blood circulation. At the next movement of the milker valve, the vacuum is applied again to the liner, which once more returns to normal to cause milk to flow again and so the action alternately continues at from 40 to 50 pulsations per minute.

Generally, grooves or slots, on the upper side of the milker slide valve and on the lower side of the control valve, move across the holes in the upper valve plate and so govern the relative movement of the slide valves in the particular manner now to be set forth.

On the upper side of the control slide valve 65 is mounted a cup 94 held down by a lock nut 97 on the regulating valve screw 95. The hole 64 in the upper stationary valve plate 59, which lies loosely on top of the milker slide valve 49 is always connected with the center port 51 in the milker slide 49, which port 51 is a slot that is open clear through, so that it is in continuous connection with the vacuum supply independently of the relative positions assumed in the operation of the pulsator by either slide valve. On the under side of the control slide valve 69 is a port 70, which is also at all times in connection with the hole 64 which covers port 51 in the milker slide valve. Thus, it can be seen that port 70 with its curved ends 71 and 72 is constantly connected to the vacuum line. By turning to the sectional view of Figure 1, it will be seen that the needle valve 96 is operable in this same port 70. Ports 79 and 78 have holes 81 and 80 in one end drilled through the control slide valve, to connect it with the annular groove 84 on the top face, over which rests the cork gasket 90 with its radial slots, which slots serve to distribute the flow of air over the lower surface of the air filter pack 89, which may be made in the usual way of felt. As the air passes upwardly at reduced velocity, the dust is deposited upon the felt.

At the top of the filter, screen wire 93 allows the air to pass between the filter cup top and the spacer sleeve 92, thence downwardly to the cross bore 88 in the stem 85, and so by the needle valve to the port 70.

Figure 10:
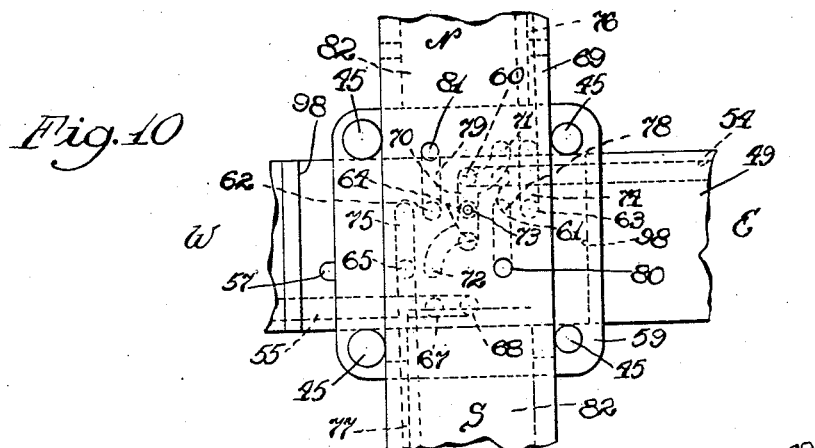
Figure 10 is a view similar to Figure 7, but showing the parts in different relative positions.
Figure 11:
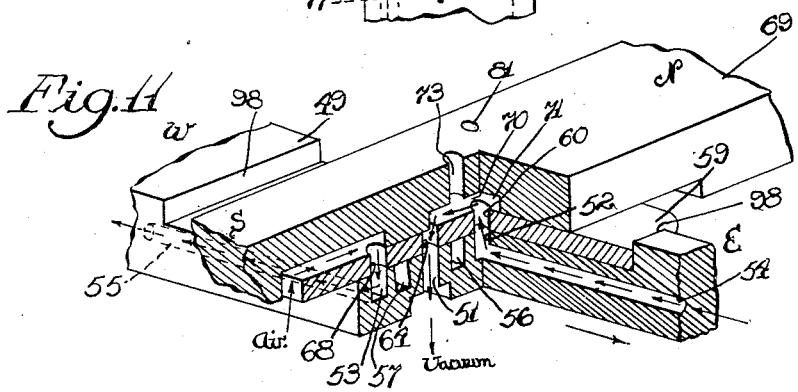
Figure 11 is a perspective cross sectional view along a staggered section line through the structure shown in Figure 10 to show another cooperative, relative relationship of the various ports and passage-ways.
Figure 12:
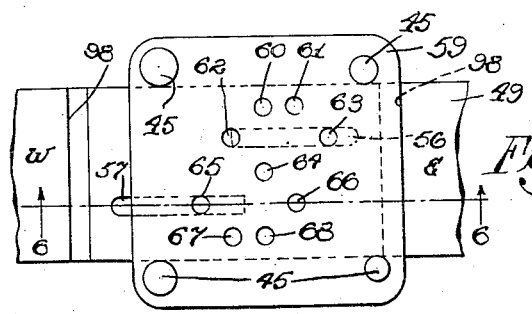
Figures 12 and 13 are plan views showing different relative positions of the lower milker slide valve with respect to the upper stationary valve plate.
Figure 14:
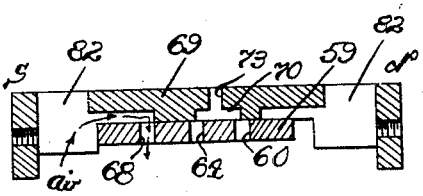
Figure 14 is a longitudinal cross sectional view through the showing of the parts in Figure 7 when viewed along the section line 14—14, with the lower slide valve left out to show a relative position which the upper slide control valve assumes with respect to the upper stationary valve plate.
Figure 13:
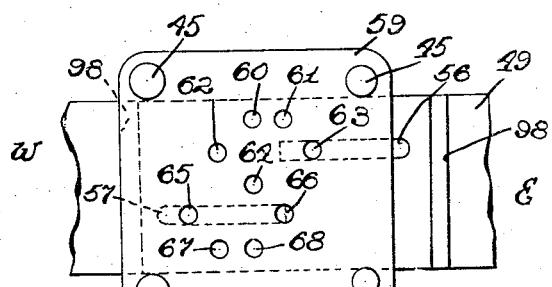

In operation, the valve port 70 moves north, as appears in Figure 11, across the upper valve plate 59, so that this port connects holes 64 and 60 as in Figure 14 in registry at the end of the stroke, while the hole 68 is uncovered and exposed to the air, which air comes up from the openings around the cross 37 at the bottom of the pulsator. On the milker slide valve 49, the port 52 is only connected with the hole 60, since at this moment the milker slide valve is at the west position and the control slide valve is moving north. The square end port 70 slowly opens the vacuum to hole 60 connected to the port 52. Then the lower slide valve moves to the east slightly, but, as it does so, port 52 slides under a hole 61 which has already been opened to port 70 through its curved end 71, as shown in Figure 10. This gives it added impetus and so holds it over even after the upper slide valve may have started south. With port 52 exposed to vacuum and port 53 exposed to air, since holes 68 and 67 in the plate 59 are uncovered, the milker slide valve 49 moves to the east until it is stopped by shoulders 98 on the upper surface, striking the upper valve plate 59.

The next movement is of the control valve 69 moving slowly towards the south, because the port 56 in the milker slide valve has its east end uncovered to air, since it is extended out to the east from underneath upper valve plate 59, as is clearly shown in Figures 7, 8, 9 and 13. Hole 63 in plate 59 is thus exposed to air and it in turn connects continuously with groove 74 in the upper control valve 69, which groove 74 leads through the passage-way 76 to the north diaphragm chamber, thereby breaking the vacuum at that end. At the same instance the south diaphragm of the control valve 69 is connected to vacuum through the drilled hole or passageway 77, which communicates with groove 75; thence to hole 65 in the plate 59, which in turn is connected to hole 66 in the plate by a groove 57 in the lower or milker slide valve 49. Then, since hole 66 and hole 62 of plate 59 are at all times in continuous communication with the corresponding grooves 79 and 78 in the control slide 69, the movement of said control slide valve is slowly south, since, as was described previously, the vacuum to these ports is regulated by the setting of the regulating screw 96.

Groove 52 in the milker slide valve connects through the drilled passage 54 to the east diaphragm chamber, and slot 53 through passage 55 connects to the west diaphragm chamber. These are, at all positions of the milker slide valve, in communication with the corresponding holes 60 and 68 in the upper valve plate 59. In like manner, grooves 75 and 74 in the control valve are connected through passage-ways 76 and 77 to the corresponding north and south diaphragm chambers.

Also these ports are in continuous communication at all positions of the control valve 69 with the holes 65 and 63 in the upper valve plate 59. In the same way, grooves 79 and 78 are always in continuous communication with holes 62 and 66.

Figure 21:
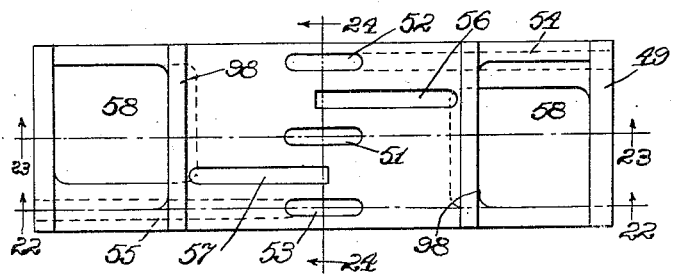
Figure 21 is a top plan view of the lower or milker slide valve.
Figure 22:
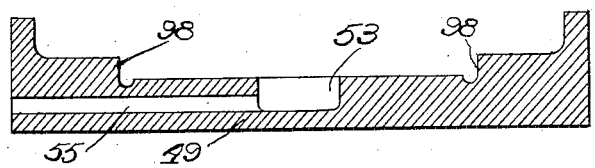
Figure 22 is a longitudinal cross sectional view of said milker control valve, as seen along the lines 22—22 appearing in Figure 21 when looking in the direction of the arrows.
Figure 23:
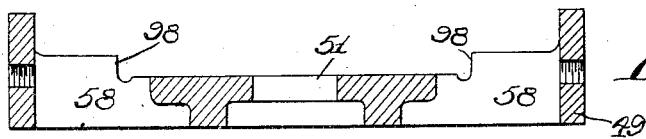
Figure 23 is a similar longitudinal sectional view of the same piece when viewed along the line 23—23 looking in the direction of the arrows, as seen in Figure 21.

It will be noticed in Figures 16 and 21 that both ends of the grooves 70 and one inner end of each of the grooves 56 and 57 are finished square. As the square ends of these grooves approach and move across their corresponding holes in the upper valve plate, they present the largest possible opening with the least movement and are important in that they make the beginning of each of the four strokes. The length and position of these grooves are so arranged that air is allowed to enter and release one diaphragm slightly in advance of opening to vacuum the diaphragm on the opposite end of each slide valve.

In operation, the upper or control slide valve moves slowly back and forth, and, at each end of its stroke, the lower or pulsator milker valve reverses its position quickly, so that the pulsations may be made by the ports on the underside of the lower slide valve are positive from vacuum to release with no dragging action between pulsations. As herein shown, the control and milker slide valves move along intersecting axes in horizontal planes.

The upper and lower stationary valve plates are made of very hard material and are polished smooth, so that there is no leakage from one port to another. The slide valves themselves are of brass or die casting material. Such surfaces slide over each other when dry, with but little friction.

Vacuum tends to pull these valves together and, the longer these faces slide on each other, the closer they will fit together. No oil whatever is required on this pulsator, so there is nothing to collect dust out of the atmosphere. The air filter removes all dust that might tend to accumulate around the needle valve by filtering it out before it reaches this position.

Thus the pulsator, having such large diaphragms, is very powerful and will pulsate on a minimum of only two inches of vacuum; or on a fifteen inch vacuum, there is available a force of twenty pounds to move the slide valves. Such a large force is not at all necessary, except that, the greater the energy supplied to the energy required, the more accurate will the pulsator speed be maintained. From a manufacturing standpoint, this pulsator should be cheap to build. There are no springs or small bearings. No small drilled holes are required in the large main body casting. All ports are put in the slide valves where they are easily accessible. Only two moving parts are involved and, as they are both inside of the body, they are thoroughly protected. A screw driver is all that is needed to take the pulsator completely apart and to put it together again.

The example herein disclosed obviously represents only one practicable form which the invention may assume. Therefore, it is the intention herein to cover all such variations and modifications thereof which do not materially depart from the spirit and scope of the invention as is indicated by the definitions thereof comprising the appended claims.

What is claimed is:

1. In a milking machine pulsator, a body including a connection to a source of vacuum and a connection to air, a milker valve, a control valve, said valves being supported in the body for relative movement in horizontal planes crosswise of each other and formed with cooperating ports, and means for regulating porting to vacuum and air whereby the control valve moves a full stroke while the milker valve is idle and then causes the milker valve to make a quick stroke to transmit pulsations to the teat cups of a milking machine.

2. In a milking machine pulsator, a body including a connection to a source of vacuum and a connection to air, a milker slide valve, a control slide valve, said valves having cooperating ports and being movable relatively to each other on intersecting axes, and means for regulating porting to vacuum and air whereby the control slide valve moves a full stroke while the milker valve is idle and then causes the milker slide valve to make a quick stroke to transmit pulsations to the teat cups of a milking machine.

3. In a milking machine pulsator, a body including a continuous connection to a source of vacuum and a connection to air, a milker slide valve, a control slide valve, said valves having cooperating ports and being slidable crosswise of each other, and means for regulating porting to vacuum and air whereby the control slide valve moves a full stroke while the milker slide valve is idle and then causes the milker slide valve to make a quick stroke to transmit pulsations to the teat cups of a milking machine.

4. In a milking machine pulsator, a body including a connection to a source of vacuum and a connection to air, a reciprocatory milker slide valve, a reciprocatory control slide valve, said valves being supported in the body in horizontal planes and movable crosswise of each other and having cooperating ports, and means for regulating porting to vacuum and air whereby the control slide valve moves substantially a full stroke while the milker valve is idle and then causes the milker slide valve to make a quick stroke to transmit pulsations to the teat cups of a milking machine.

5. In a milking machine pulsator, a body including a continuous connection to a source of vacuum and a connection to air, a reciprocatory milker slide valve, a reciprocatory control slide valve, said valves lying in horizontal planes and being supported in the body and having cooperating ports, and stationary horizontally disposed valve means sandwiched between the slide valves for regulating porting to vacuum and air whereby the control slide valve moves to cause the milker slide valve to make a quick stroke to transmit pulsations to the teat cups of a milking machine.

6. In a milking machine pulsator, a body including a connection to a source of vacuum and a connection to air, a milker valve, a control valve, a valve member, said valve parts all lying in horizontal planes one above the other and being supported in the body and provided with ports connectible with air and vacuum and cooperable in a manner to produce relative movement of the milker and control valves whereby pulsations are transmitted to teat cups of a milking machine.

7. In a milking machine pulsator, a body including a connection to a source of vacuum and a connection to air, a milker valve, a control valve, a valve member between the milker and control valves, said valve parts all lying in horizontal planes and being supported in the body and provided with ports connectible with air and vacuum and cooperable in a manner to produce relative movement of the milker and control valves whereby pulsations are transmitted to teat cups of a milking machine.

8. In a milking machine pulsator, a body including a connection to a source of vacuum and a connection to air, a milker slide valve, a control slide valve, a stationary valve member between the two slide valves, said valve parts all lying in horizontal planes and being supported in the body and provided with ports connectible with air and vacuum and cooperable in a manner to produce relative movement of the milker and control valves whereby pulsations are transmitted to teat cups of a milking machine.

9. In a milking machine pulsator, a body including a connection to a continuous source of vacuum and a connection to air, a milker slide valve, a control slide valve, a valve member, said valve parts being all disposed in horizontal planes and supported in the body and provided with ports connectible with air and vacuum and cooperable in a manner to produce relative horizontal sliding movement of the milker and control valves with respect to each other and the valve member whereby pulsations are transmitted to teat cups of a milking machine.

10. In a milking machine pulsator, a body including a connection to a continuous source of vacuum and a connection to air, a milker valve, a control valve said milker and control valve being movable along intersecting axes, a valve member, said valve parts provided with ports connectible with air and vacuum and cooperable in a manner to produce the relative cross movement of the milker and control valves whereby pulsations are transmitted to teat cups of a milking machine.

11. In a milking machine pulsator, a body including a connection to a source of vacuum and a connection to air, a reciprocatory milker valve, a reciprocatory control valve, a stationary valve member between the two reciprocatory valves, said valve parts all lying in horizontal planes and being supported in the body and provided with ports connectible with air and vacuum and cooperable in a manner to produce relative horizontal reciprocatory movement of the milker and control valves whereby pulsations are transmitted to teat cups of a milking machine.

12. In a milking machine pulsator, a body including a connection to a continuous source of vacuum and a connection to air, a valve member having communication with said connections, a milker slide valve reciprocable relative to the said valve member, said slide valve provided with ports to connect with air and vacuum, a second valve member provided with ports connectible to air and vacuum, and a control slide valve movable relative to the second valve member and milker slide valve, said control valve provided with ports arranged so that the control valve moves a full stroke while the milker slide valve is held stationary and thereupon at the end of the movement of the control slide valve the milker slide valve moves quickly to produce pulsations to be communicated to teat cups of a milking machine.

13. In a milking machine pulsator, a body including a connection to a continuous source of vacuum and a connection to air, a valve member having communication with said connections, a milker valve reciprocable relative to the said valve member, said milker valve provided with ports to connect with air and vacuum, a second valve member provided with ports connectible to air and vacuum, and a control valve movable relative to the second valve member and milker valve, said control valve provided with ports arranged so that the control valve moves a full stroke while the milker valve is held stationary and thereupon at the end of the movement of the control valve the milker valve moves quickly to produce pulsations to be communicated to teat cups of a milking machine, said body enclosing all of said valve mechanism.

14. In a milking machine pulsator, a body including a connection to a source of vacuum and a connection to air, a valve plate supported in the body and having communication with said connections, a milker slide valve reciprocable on said valve plate, said slide valve provided with ports to connect with air and vacuum, a second valve plate supported in the body and provided with ports connectible to air and vacuum and a control slide valve supported on the second valve plate, said control valve provided with ports arranged so that the control valve moves a full stroke while the milker slide valve is held stationary and thereupon at the end of the movement of the control slide the milker slide moves quickly to produce pulsations to be communicated to teat cups of a milking machine.

15. In a milking machine pulsator, a body including a connection to a source of vacuum and a connection to air, a valve member having communication with said connections, a milker slide valve, a second valve member, and a control slide valve, all of said valve members and slide valves having ports therein to cause relative movement of the parts under action of air and vacuum to produce pulsations to be communicated to teat cups of a milking machine.

16. In a milking machine pulsator, a body including a connection to a continuous source of vacuum and a connection to air, a valve member having communication with said connections, a milker slide valve, said slide valve provided with ports to connect with air and vacuum, a second valve member, and a control slide valve, all of said slide valves and valve members being inside the body and having ports connectible with air and vacuum so that the control valve moves a full stroke while the milker slide valve is held stationary and thereupon at the end of the movement of the control slide the milker slide moves quickly to produce pulsations to be communicated to teat cups of a milking machine.

17. In a milking machine pulsator, a body including a connection to a continuous source of vacuum and a connection to air, a stationary valve member having communication with said connections, a milker slide valve, said slide valve provided with ports to connect with air and vacuum, a second stationary valve member provided with ports connectible to air and vacuum, and a control slide valve movable relative to the milker slide valve, said control valve provided with ports arranged so that the control valve moves a full stroke while the milker slide valve is held stationary and thereupon at the end of the movement of the control slide the milker slide moves quickly to produce pulsations to be communicated to teat cups of a milking machine.

18. In a milking machine pulsator, a body having four open sides, means connecting the body to vacuum and air, a cap closing each side and enclosing a diaphragm to provide four diaphragm chambers, a pair of relatively movable valve members supported in the body and connected to said diaphragms, said members provided with cooperating ports certain of which communicate with air and vacuum, other ports in the members to lead air or vacuum to the diaphragm chambers, and valve means associated with the valve members to cause movement of said valve members whereby pulsations are transmitted to teat cups of a milking machine.

19. In a milking machine pulsator, a body having four open sides, means connecting the body to vacuum and air, a cap closing each side and enclosing a diaphragm to provide four diaphragm chambers, a control slide valve and a milker slide valve supported in the body and connected to said diaphragms, said slide valves provided with cooperating ports certain of which communicate with air and vacuum, other ports in the slide valves to lead air or vacuum to the diaphragm chambers, and valve means associated with the slide valves whereby pulsations are transmitted to teat cups of a milking machine.

20. In a milking machine pulsator, a body having four open sides, means connecting the body to vacuum and air, a cap closing each side and enclosing a diaphragm to provide four diaphragm chambers arranged in opposed pairs, a pair of relatively movable reciprocatory valve members supported in the body and connected at their ends to said diaphragms, said members reciprocable along intersecting axes and being provided with cooperating ports certain of which communicate with air and vacuum, other ports in the members to lead air or vacuum to the diaphragm chambers, and a valve plate between the valve members, whereby pulsations are transmitted to teat cups of a milking machine.

21. In a milking machine pulsator, a body having four open sides, said body including a base provided with means connecting the body to vacuum and air, a cap closing each side and enclosing a diaphragm to provide four diaphragm chambers, a pair of relatively movable valve members supported on the base and connected to said diaphragms, said members provided with cooperating ports certain of which communicate with air and vacuum, other ports in the members to lead air or vacuum to the diaphragm chambers, and a valve plate carried on the base between the valve members, whereby pulsations are transmitted to teat cups of a milking machine.

22. In a milking machine pulsator, a body having four open sides, said body including a base provided with means connecting the body to vacuum and air, posts on said base, a cap closing each open side of the body and enclosing a diaphragm to provide four diaphragm chambers, a pair of relatively movable valve members slidably supported on the base and guided by said posts, said slide members having their ends each connected to a diaphragm, said members provided with cooperating ports certain of which communicate with air and vacuum, other ports in the members to lead air or vacuum to the diaphragm chambers, and a valve plate mounted on the posts between the slide valve members, whereby pulsations are transmitted to teat cups of a milking machine.

23. In a milking machine pulsator, a body having four open sides, means connecting the body to vacuum and air, a cap closing each side and enclosing a diaphragm to provide four diaphragm chambers, relatively movable milker and control valve members supported in the body for relative sliding movement and connected to said diaphragm, said members provided with cooperating ports certain of which communicate with air and vacuum, other ports in the members to lead air or vacuum to the diaphragm chambers, valve means associated with the valve members to cause pulsations to be transmitted to teat cups of a milking machine, and means for filtering the air used in the ports.

24. In a milking machine pulsator, a body including a connection to a source of vacuum and a connection to air, a milker slide valve, a control slide valve, said valves having cooperating ports and being movable relatively to each other, means for regulating porting to vacuum and air whereby the control slide valve moves a full stroke while the milker valve is idle and then causes the milker to make a quick stroke to transmit pulsations to the teat cups of a milking machine, and an air filter means associated with the control slide valve.

25. A pulsator for milking machines comprising a body including a base open to air and a source of vacuum, a control valve and milker valve supported on the base for relative movement inside the body along intersecting axes, means associated with said valves utilizing air and vacuum to cause such relative movement of the valves, and an air filter carried by the control valve.

26. A pulsator for milking machines comprising a body including a base open to air and a source of vacuum, a control valve and milker valve supported on the base for relative movement inside the body along intersecting axes, means associated with said valves utilizing air and vacuum to cause such relative movement of the valves, and a speed regulator throttle means carried by the control valve.

In testimony whereof I affix my signature.

FLOYD G. HODSDON.